United States Patent
Samudrala et al.

(10) Patent No.: US 8,613,451 B2
(45) Date of Patent: Dec. 24, 2013

(54) CLOTH SEAL FOR TURBO-MACHINERY

(75) Inventors: Omprakash Samudrala, Niskayuna, NY (US); Neelesh Nandkumar Sarawate, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 117 days.

(21) Appl. No.: 12/954,973

(22) Filed: Nov. 29, 2010

(65) Prior Publication Data
US 2012/0133102 A1    May 31, 2012

(51) Int. Cl.
*F16J 15/08*    (2006.01)
(52) U.S. Cl.
USPC ........... 277/654; 277/650; 277/651; 277/652; 277/653; 277/644
(58) Field of Classification Search
USPC ................. 277/644, 650, 651, 652, 653, 654
See application file for complete search history.

(56) References Cited

U.S. PATENT DOCUMENTS

| | | | |
|---|---|---|---|
| 2,249,127 A * | 7/1941 | Goetze ........................... | 277/653 |
| 3,026,367 A * | 3/1962 | Hartwell ....................... | 174/357 |
| 5,172,920 A * | 12/1992 | Schlenk ......................... | 277/654 |
| 5,509,669 A * | 4/1996 | Wolfe et al. ..................... | 277/654 |
| 5,915,697 A * | 6/1999 | Bagepalli et al. .............. | 277/627 |
| 5,934,687 A | 8/1999 | Bagepalli et al. | |
| 6,162,014 A * | 12/2000 | Bagepalli et al. ........... | 415/170.1 |
| 6,345,494 B1 | 2/2002 | Coslow | |
| 6,502,825 B2 | 1/2003 | Aksit et al. | |
| 6,547,256 B2 * | 4/2003 | Aksit et al. ..................... | 277/628 |
| 6,599,089 B2 | 7/2003 | Aksit et al. | |
| 6,609,885 B2 | 8/2003 | Mohammed-Fakir et al. | |
| 6,609,886 B2 | 8/2003 | Aksit et al. | |
| 6,619,669 B2 | 9/2003 | Zhuo et al. | |
| 6,637,751 B2 | 10/2003 | Aksit et al. | |
| 6,637,752 B2 | 10/2003 | Aksit et al. | |
| 6,652,231 B2 | 11/2003 | Vedantam et al. | |
| 6,733,234 B2 | 5/2004 | Paprotna et al. | |
| 7,334,800 B2 | 2/2008 | Minnich | |
| 7,360,769 B2 | 4/2008 | Bennett | |
| 7,367,567 B2 | 5/2008 | Farah et al. | |
| 8,142,142 B2 * | 3/2012 | Zborovsky et al. ........... | 415/185 |
| 2002/0079654 A1 * | 6/2002 | Aksit et al. ..................... | 277/650 |
| 2002/0121744 A1 | 9/2002 | Aksit et al. | |
| 2003/0011145 A1 | 1/2003 | Zhuo et al. | |
| 2003/0039542 A1 | 2/2003 | Cromer | |
| 2003/0133793 A1 | 7/2003 | Vedantam et al. | |
| 2004/0052637 A1 | 3/2004 | Paprotna et al. | |
| 2006/0091617 A1 | 5/2006 | Minnich | |
| 2006/0197287 A1 | 9/2006 | Farah et al. | |
| 2008/0112804 A1 | 5/2008 | Bhate et al. | |
| 2008/0258399 A1 * | 10/2008 | Gelorme et al. .............. | 277/312 |
| 2009/0085305 A1 | 4/2009 | Demiroglu et al. | |
| 2009/0322040 A1 * | 12/2009 | Banba et al. ................... | 277/654 |
| 2010/0247300 A1 | 9/2010 | Morgan | |
| 2011/0241297 A1 * | 10/2011 | Morgan et al. ................ | 277/630 |
| 2012/0061923 A1 * | 3/2012 | Farzana ......................... | 277/654 |

* cited by examiner

*Primary Examiner* — Vishal Patel
*Assistant Examiner* — Eugene G Byrd
(74) *Attorney, Agent, or Firm* — Ann M. Agosti

(57) ABSTRACT

The present invention provides a cloth seal for use with turbine components. The cloth seal may include a number of cloth layers, a shim positioned between the cloth layers, and an end seal positioned at an end of the cloth layers so as to block a leakage flow path through at least one of the cloth layers.

20 Claims, 7 Drawing Sheets

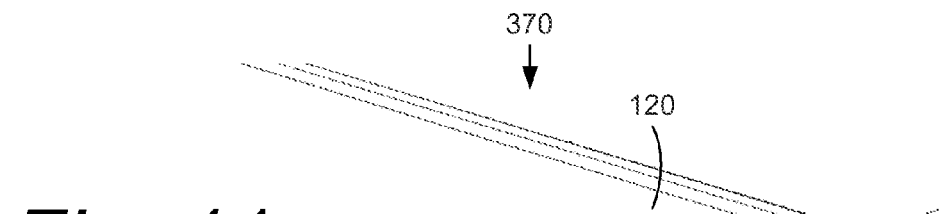
*Fig. 11*
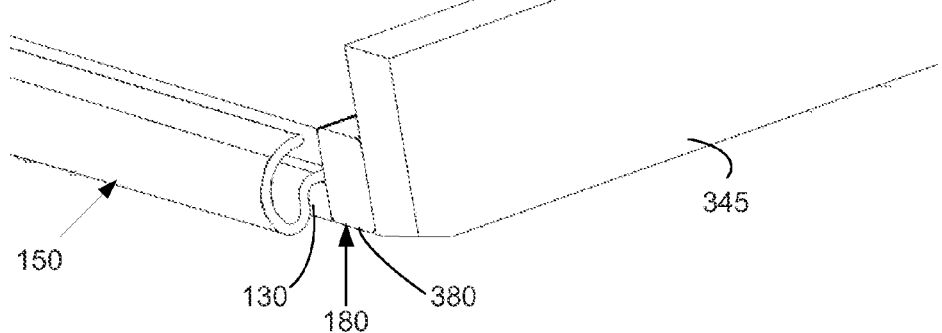
*Fig. 12*
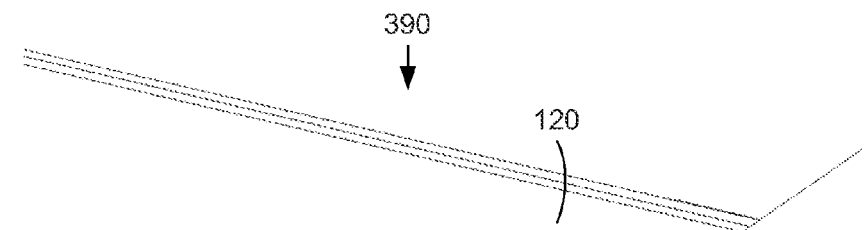
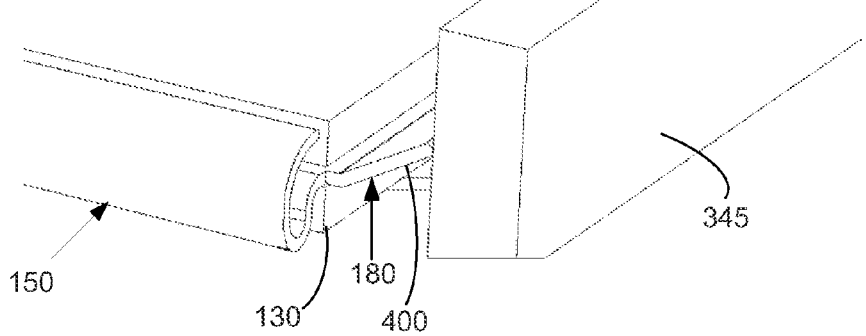

CLOTH SEAL FOR TURBO-MACHINERY

TECHNICAL FIELD

The present application relates generally to turbo-machinery such as gas turbine engines and more particularly relates to a cloth seal with reduced end gap leakage therethrough for use between multiple turbine components.

BACKGROUND OF THE INVENTION

Generally described, turbo-machinery, such as gas turbine engines and the like, includes a main gas flow path therethrough. The main gas flow path generally includes a gas intake, a compressor, a combustor, a turbine, and a gas outlet. Gas leakage, both out of the gas flow path or into the gas flow path, may be detrimental to overall engine performance and is generally otherwise undesirable. Gas path leakage may lower the efficiency of the gas turbine engine, increase fuel costs, and possibly increase emission levels.

Secondary gas flows may be used within the gas turbine engine to cool the various heated components. Specifically, cooling air extracted from the later stages of the compressor in a gas turbine engine may be used for cooling the components therein and for purging gaps and cavities between adjacent components. Cloth seals may be mounted in slots between the adjacent components so as to control the amount of the secondary flow extracted by metering its leakage into the hot gas path. Cloth seals hence are widely used to control the amount of cooling and purge air required to prevent hot gas ingestion and overheating of turbine parts such as shrouds, nozzles, and the like. Cloth seals thus may seal the gaps between adjacent turbine parts (shroud/shroud, shroud/nozzle, etc.) that are needed to accommodate typical thermal and mechanical transients during turbine engine operation. Cloth seals provide the dual advantage of effectively sealing these gaps while also providing good wear resistance due to the presence of the sacrificial cloth layers.

Reducing the leakage through the cloth seals themselves thus may reduce the amount of the secondary flow extracted from the compressor stages. Likewise, the reduced leakage through the cloth seals may result in improved overall thermal efficiency and power output from the turbine. Leakage across a cloth seal generally may be found in two areas:

(1) leakage from under a metallic shim that runs the length of the cloth seal; and (2) leakage through a gap between the ends of the cloth seal and the ends of the mating slot.

The latter part may be dominate in typical cloth seals and may contribute as much as seventy-five percent (75%) of the total leakage therethrough. Reducing the end gap may not be feasible due to assembly considerations, tolerance stack up, and the need to accommodate possible relative motion between the adjacent components. A portion of the end gap leakage may travel through the clearance gap between the two turbine components, while a majority of the leakage may extend through the porous bottom cloth layer along the seal length and eventually leak through the clearance gap. This leakage through the porous bottom cloth layer may contribute to about half of the total leakage therethrough.

There is thus a desire for improved cloth seal design. Such an improved design may limit end gap leakage, particularly through the porous bottom cloth layer. Reducing the leakage therethrough may improve the overall efficiency and power output of the gas turbine engine as a whole.

SUMMARY OF THE INVENTION

The present invention thus provides a cloth seal for use with turbine components. The cloth seal may include a number of cloth layers, a shim positioned between the cloth layers, and an end seal positioned at an end of the cloth layers so as to block a leakage flow path through at least one of the cloth layers.

The present invention further provides a cloth seal for use with turbine components. The cloth seal may include a number of cloth layers, a shim positioned between the cloth layers, and end sealing means positioned at an end of the cloth layers so as to block a leakage flow path through at least one of the cloth layers.

The present invention further provides a cloth seal for use with turbine components. The cloth seal may include an upper cloth layer, a lower cloth layer, a shim positioned between the upper cloth layer and the lower cloth layer, and one or more end flange seals positioned at an end of the upper cloth layer and the lower cloth layer so as to block a leakage flow path therethrough.

These and other features and improvements of the present application will become apparent to one of ordinary skill in the art upon review of the following detailed description when taken in conjunction with the several drawings and the appended claims.

BRIEF DESCRIPTION OF DRAWINGS

FIG. 11 is a side cross-sectional view of a further embodiment of a cloth seal as may be described herein.

FIG. 12 is a side cross-sectional view of a further embodiment of a cloth seal as may be described herein.

DETAILED DESCRIPTION

Figure 1:
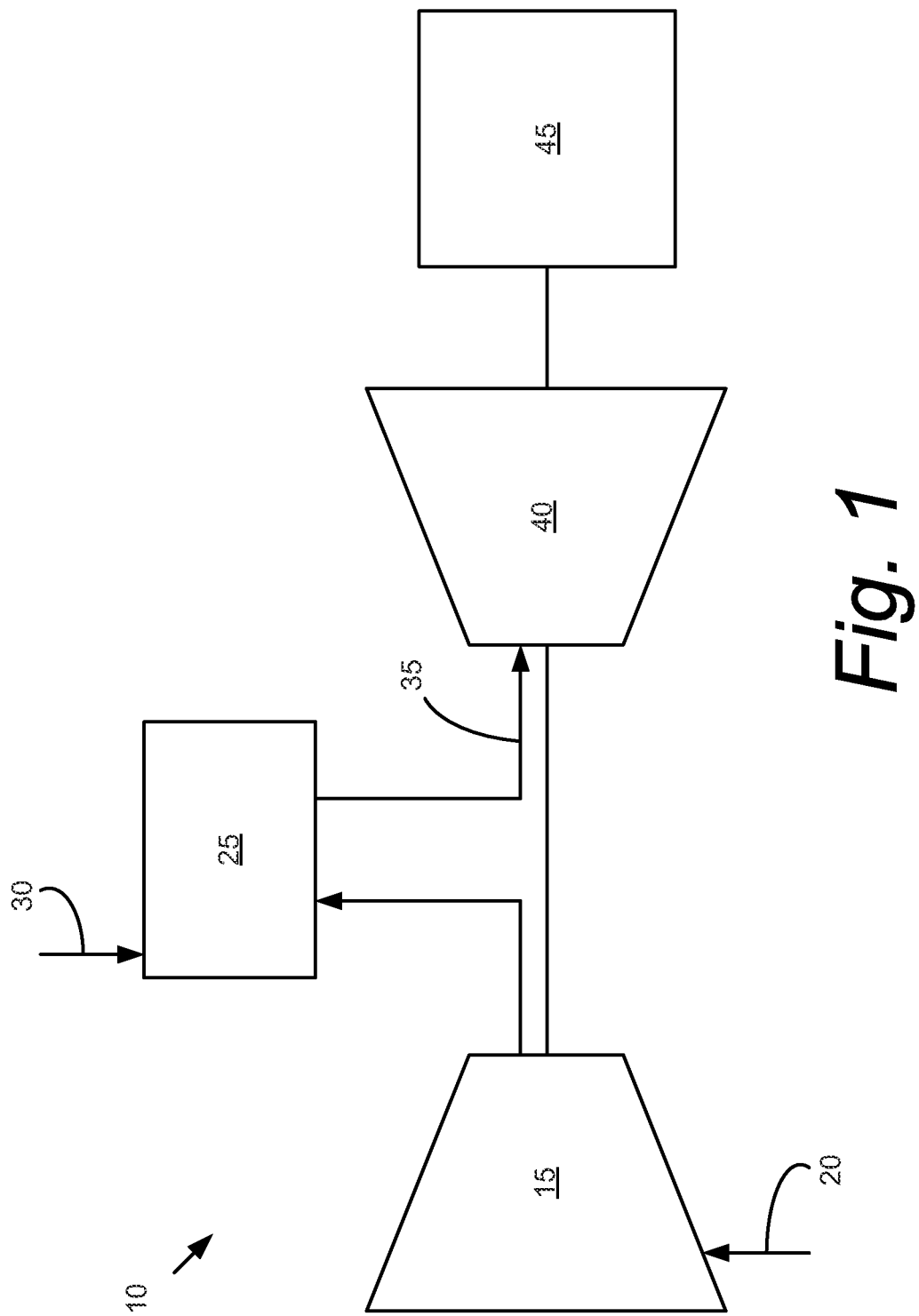
FIG. 1 is a schematic view of a gas turbine engine.

Referring now to the drawings, in which like numerals refer to like elements throughout the several views, FIG. 1 shows a schematic view of a rotary machine such as gas turbine engine 10. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is delivered in turn to a turbine 40. The flow of combustion gases 35 drives the turbine 40 so as to produce mechanical work. The mechanical work produced in the turbine 40 drives the compressor 15 and an external load 45 such as an electrical generator and the like.

The gas turbine engine 10 may use natural gas, various types of syngas, and/or other types of fuels. The gas turbine engine 10 may be one of any number of different gas turbine engines offered by General Electric Company of Schenectady, N.Y. and the like. The gas turbine engine 10 may have other configurations and may use other types of components. Other types of gas turbine engines also may be used herein. Multiple gas turbine engines 10, other types of turbines, and other types of power generation equipment also may be used herein together. Other types of rotary machines also may be used herein.

Figure 2:
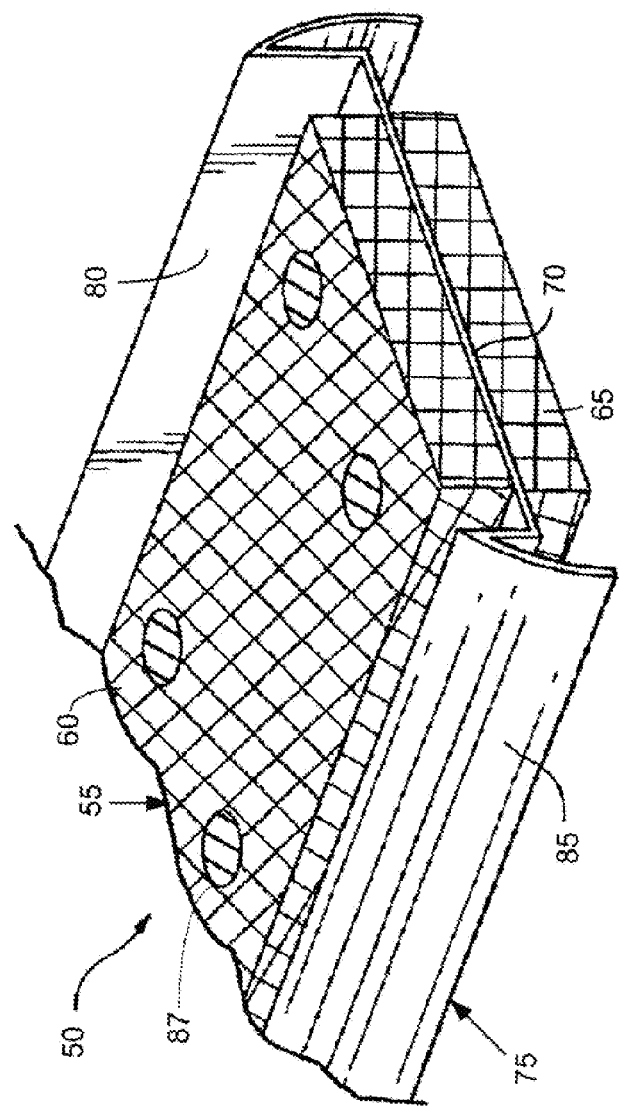
FIG. 2 is a partial perspective view of a known cloth seal.

FIG. 2 shows an example of a known cloth seal 50. The cloth seal 50 may include a number of cloth layers 55. The cloth layers 55 may be out of a woven metallic cloth. The cloth layers 55 also may include composites, ceramics, and combinations thereof. In this example, an upper cloth layer 60 may be separated from a lower cloth layer 65 via a shim 70. The shim 70 may be made from stainless steel or other types of materials. The shim 70 may extend substantially along the length and width of the cloth seal 50. The shim 70 also may include a number of side flanges 75 extending from the sides of the cloth layers 55. The side flanges 75 may include a linear leg 80 and an arcuate leg 85. Other shapes may be used herein. The cloth layers 55 may be spot welded 87 to the shim 70 or otherwise attached. Multiple shim layers also may be used herein. The cloth seal 50 may have any desired size or shape. Other types and other configurations of the cloth seal 50 may be known.

Figure 3:
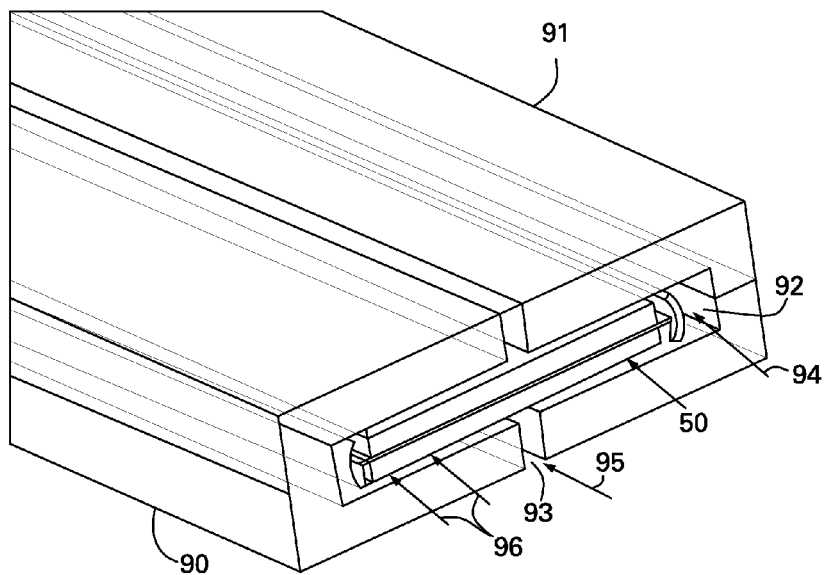
FIG. 3 is a partial perspective view of a known cloth seal positioned between turbine components.

FIG. 3 shows the use of the known cloth seal 50 within a number of turbine components, a first component 90 and a second component 91. Each component 90, 91 has a slot 92 with the cloth seal 50 therein and a slot gap 93 therebetween. The components 90, 91 may be shrouds, nozzles, or any type of adjacent components. As described above, a side leakage path 94 may extend between the side flanges 75 of the cloth seal 50 and the walls of the slots 92 of the components 90, 91; an end leakage path 95 may extend about the slot gap 93 at the end gaps (between the seal and the mating slots); and a second end leakage path 96 may extend through the lower cloth layer 65 of the cloth seal 50. The second end leakage path 96 through the lower cloth layers 65 may be about half of the total leakage therethrough.

Figure 4:
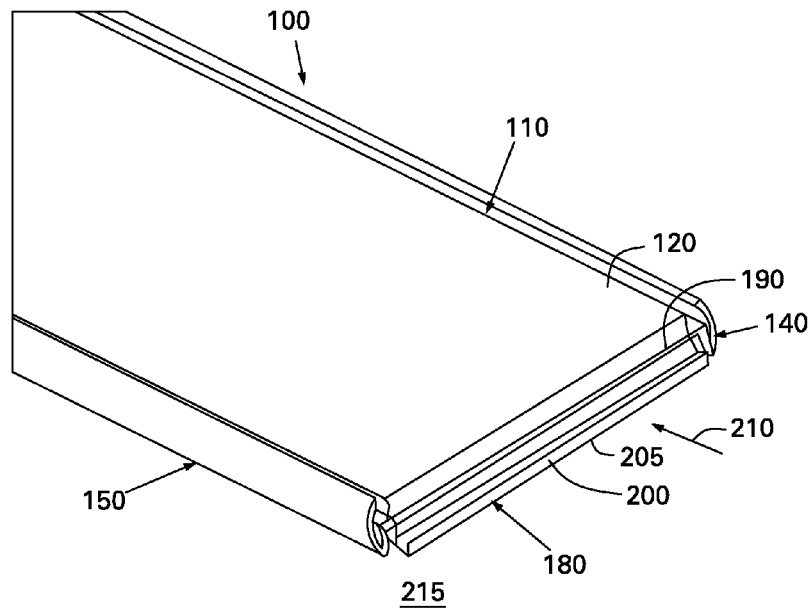
FIG. 4 is a partial perspective view of a cloth seal as may be described herein.
Figure 5:
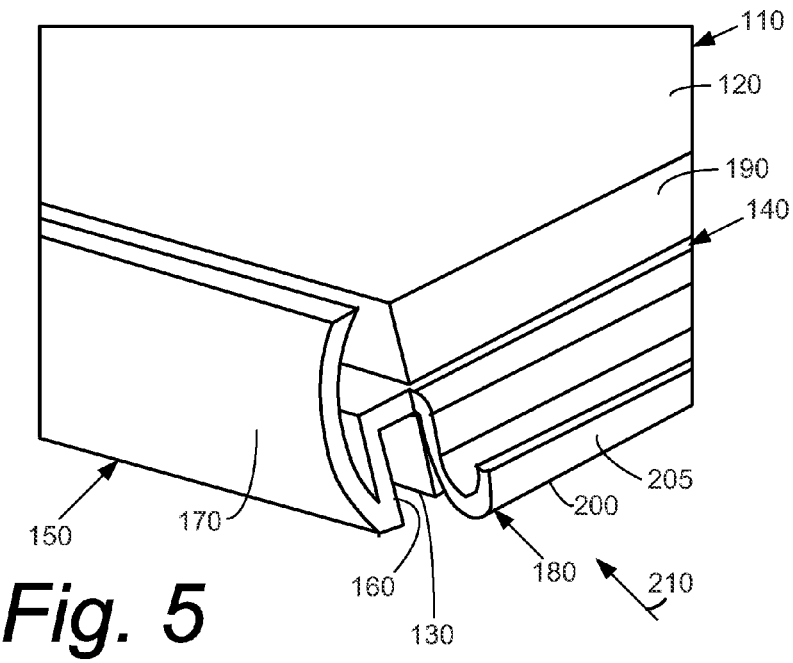
FIG. 5 is a close up partial perspective view of the cloth seal of FIG. 4.

FIGS. 4 and 5 show a cloth seal 100 as may be described herein. Similar to that described above, the cloth seal 100 may include a number of cloth layers 110. In this example, an upper cloth layer 120 and a lower cloth layer 130 may be used. Any number of the cloth layers 110 may be used herein. A shim 140 may separate the upper cloth layer 120 and the lower cloth layer 130. The shim 140 may extend substantially along the length and width of the cloth seal 100. The shim 140 may be made from stainless steel or other types of materials. The shim 140 also may include a number of side flanges 150. In this example, the side flanges 150 may include a linear leg 160 and an arcuate leg 170. Other shapes also may be used herein. The cloth layers 110 may be spot welded to the shim 140 or otherwise attached. Multiple shim layers also may be used herein. The cloth seal 100 as a whole may have any desired size or shape. Other types and other configurations of the cloth seal 100 may be known.

In this example, the cloth seal 100 also may include an end seal 180 at one or both ends 190 thereof. Specifically, the end seal 180 may take the form of end flange seal 200. The shim 140 may extend beyond cloth layers 110 of the cloth seal 100 and end in the end flange seal 200. The end flange seal 200 may have a substantially curved shape 205 with a somewhat incomplete upward "U" shape. The curved shape 205 may be stamped or molded therein. The end flange seal 200 largely covers the lower cloth layer 130. The end flange seal 200 also may contact the end walls of the mating slots. The end flange seal 200 thus blocks the lower cloth layer 130 at the end 190 so as to limit a leakage flow path 210 therethrough. Other configurations may be used herein.

The leakage flow path 210 includes at least the end leakage path 96 described above as well as the side leakage path 94 and the end leakage path 95. The end flange seal 200 may be somewhat compliant such that end gaps 215 of varying sizes (due to tolerance variations and the like) in the slots 92 likewise may be sealed at least in part so as to achieve consistent sealing independent of the variations in the slots 92 and the end gaps 215.

Figure 6:
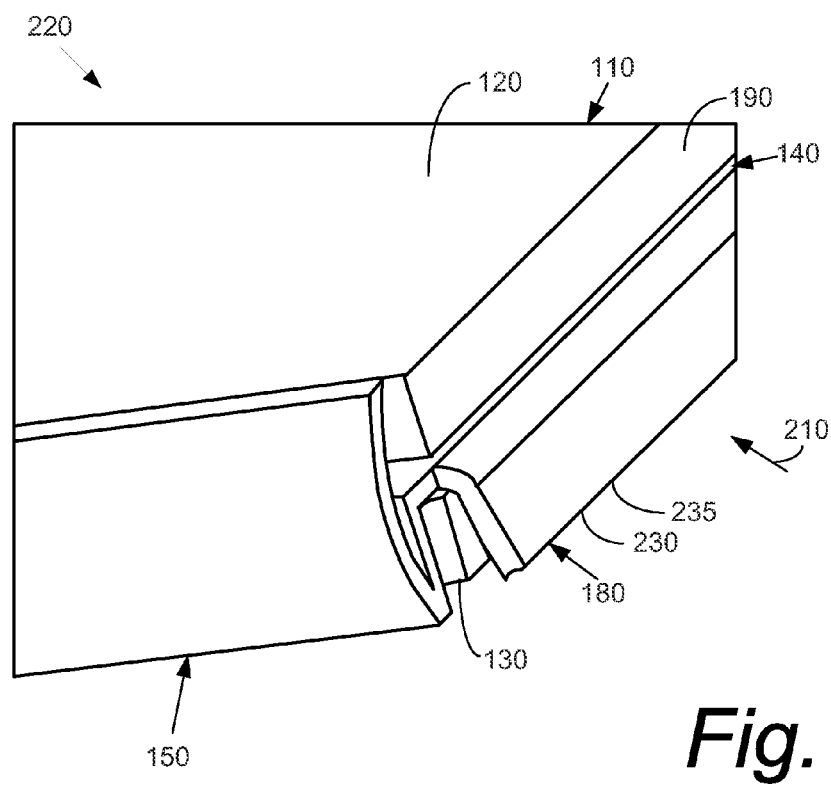
FIG. 6 is a partial perspective view of an alternative embodiment of a cloth seal as may be described herein.

FIG. 6 shows an alternative embodiment of a cloth seal 220 as may be described herein with the end seal 180. In this example, the end seal 180 may take the form of end flange seal 230. The shim 140 may extend beyond cloth layers 110 of the cloth seal 220 and end in the end flange seal 230. The end flange seal 230 may have a substantially flat downwardly bent shape 235. The flat downwardly bent shape 235 may include a bend of about ninety degrees (90°) or so. Other shapes and angles may be used herein. The flat downwardly bent shape 235 of the end flange seal 230 thus covers and seals the lower cloth layer 130 and the leakage flow path 210 therethrough. Other configurations may be used herein.

Figure 7:
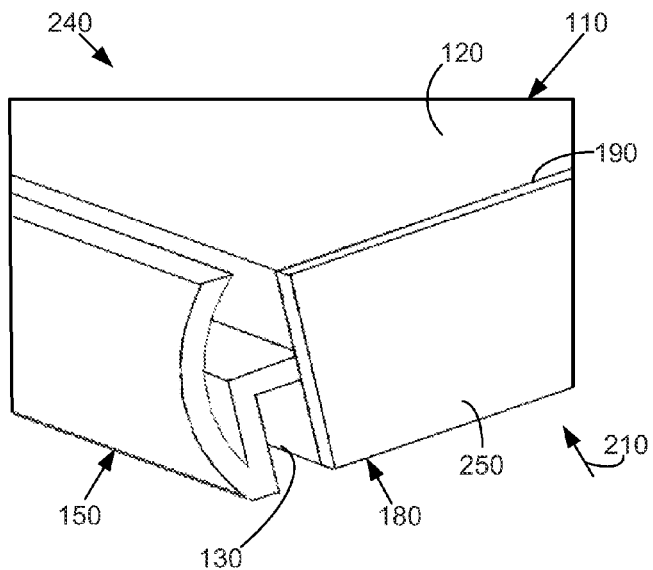
FIG. 7 is a side cross-sectional view of a further embodiment of a cloth seal as may be described herein.

FIG. 7 shows an alternative embodiment of a cloth seal 240 as may be described herein with the end seal 180. In this example, the end seal 180 may include one or more end shim seals 250 positioned across one or more of the ends 190 of the cloth seal 240. The end shim seals 250 may be welded to the cloth seal 240 or otherwise fastened to the ends 190 of the cloth seal 240. The end shim seals 250 may have about a height and width similar to that of the cloth seal 240. The end shim seals 250 may be made out metals, ceramics, and the like to impede the leakage flow path 210 therethrough. Other configurations may be used herein.

Figure 8:
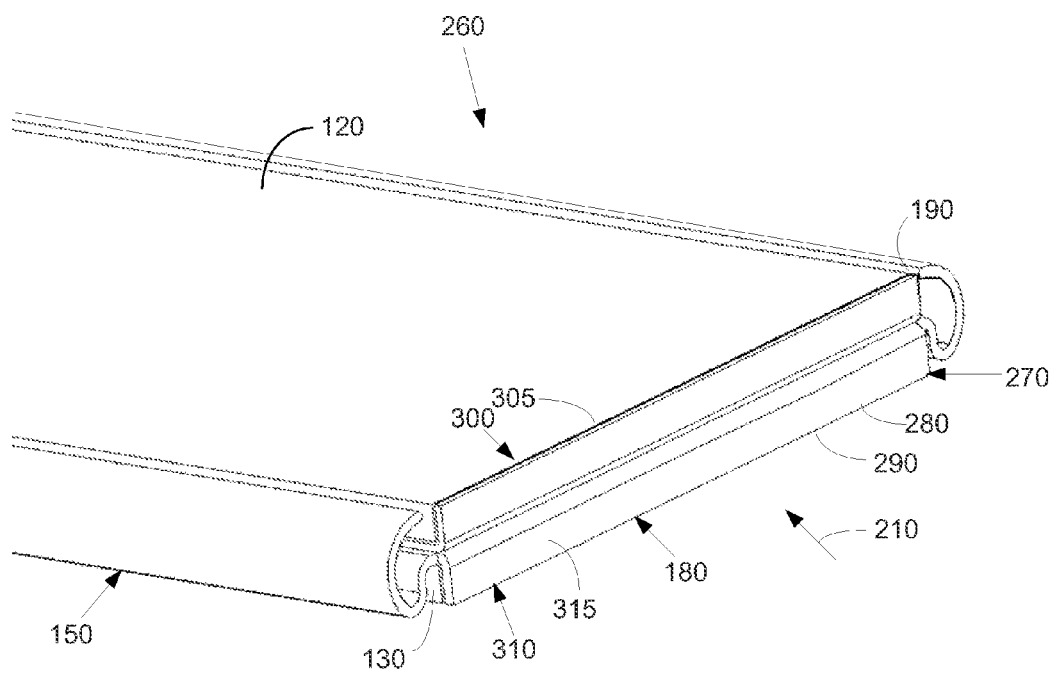
FIG. 8 is a side cross-sectional view of a further embodiment of a cloth seal as may be described herein.

FIG. 8 shows a further embodiment of a cloth seal 260 as may be described herein with the end seal. In this example, the cloth seal 260 may include two (2) or more shims 270. One or both of the shims 270 may include the end seal 180 in the form of an end flange seal 280 thereon. The end flange seals 280 may include an upwardly and a downwardly bent shape 290. A first shim 300 may have an end flange seal 280 with an upward bent shape 305 while a second shim 310 may have an end flange seal 280 with a downwardly bent shape 315. The bent shapes 290 may be substantially curved or flat. The end flange seals 280 thus cover both the upper cloth layer 120 and the lower cloth layer 130 so as to block the leakage flow path 210 therethrough. Other configurations may be used herein.

Figure 9:
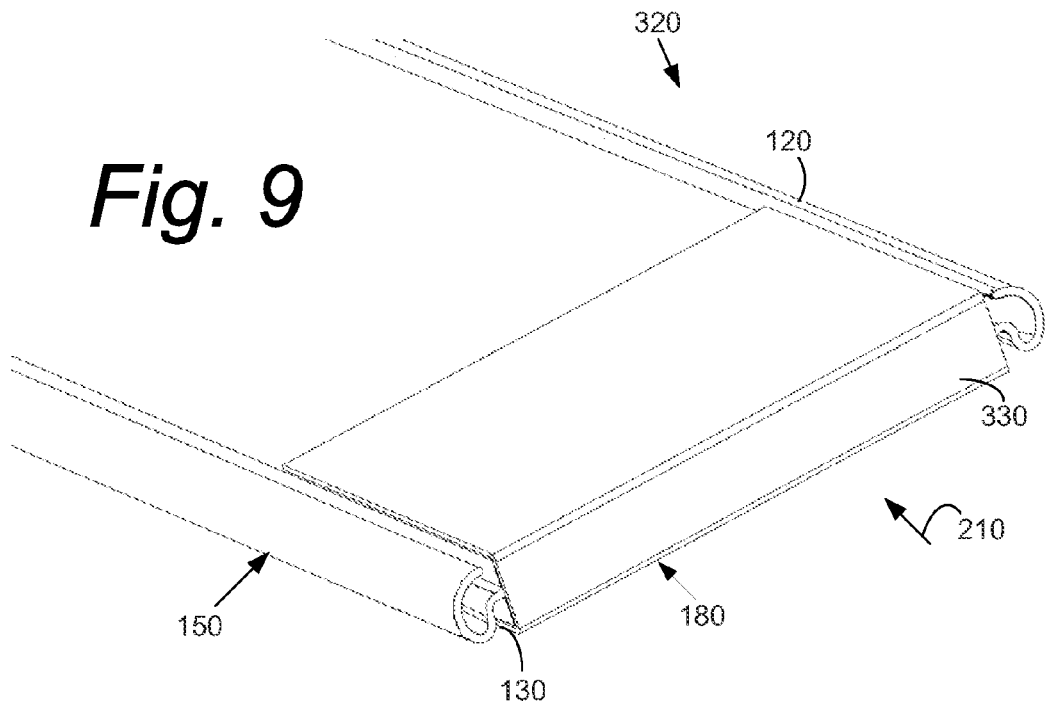
FIG. 9 is a side cross-sectional view of a further embodiment of a cloth seal as may be described herein.

FIG. 9 shows a further embodiment of a cloth seal 320 as may be described herein with the end seal 180. In this example, the end seal 180 may take the form of one or more clip seals 330 positioned at the ends 190 of the cloth seal 320. The clip seals 330 may function in a manner similar to the end shim seals 250 and the like described above so as to block the leakage flow path 210 therethrough. Other configurations may be used herein.

Figure 10:
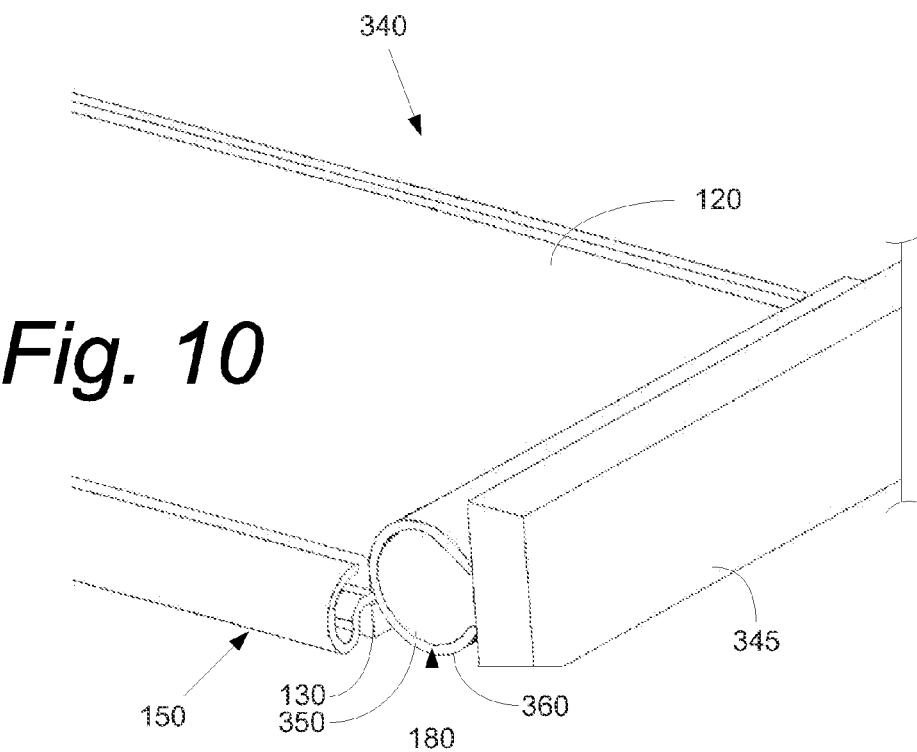
FIG. 10 is a side cross-sectional view of a further embodiment of a cloth seal as may be described herein.

FIG. 10 shows a further embodiment of a cloth seal 340 as may be described herein with the end seal 180. In this example, one or more compliant seals 350 may be positioned at the ends 190 of the cloth seal 340 and in contact with an end wall 345 of a supporting structure. In this example, a compliant "C" seal 360 may be used. Other types of compliant seals 350 may be used herein including rope seals, "W" seals, and the like so as to block the leakage flow path 210 therethrough. Other configurations may be used herein.

FIG. 11 shows a further embodiment of a cloth seal 370 as may be described herein with the end seal 180. In this example, the end seal 180 may include high temperature sealants 380 attached at the ends 190 of the cloth seal 370 so as to block the leakage flow path 210 therethrough. Any type of temperature resistant sealing material may be used herein to block or at least reduce the porous nature of the cloth layers 110. Other configurations may be used herein.

FIG. 12 shows a further embodiment of a cloth seal 390 as may be described herein with the end seal 180. In this example, the end seal 180 may include an extended shim 400 at the end 190 of the cloth seal 390. The extended shim 400 may extend into the end gap 215 so as to block the leakage flow path 210 therethrough. The extended shim 400 may be bent upwards for assembly. The extended shim may spring back to contact the end wall. High pressure thereon ensures contact and prevents leakage therethrough. Other configurations may be used herein.

Leakage through at least the lower cloth layer 130 thus may be reduced so as to improve overall system performance and efficiency through the use of the end seals 180 described herein. The various embodiments of the end seals 18 described herein thus block the leakage flow path 210 through the cloth seals 100 so as to provide a lower secondary flow extraction. Overall leakage through the cloth seals 100 may be reduced by fifty percent (50%) or more. Leakage through the end gaps 215 between the slots 92 also may be reduced. Multiple types of end seals 180 may be used herein together. Other configurations may be used herein. The cloth seals 100 may be used with any type of adjacent components positioned about a gas path.

In addition of the various end sealing means described above, other means included herein involve reducing the porosity of the cloth layer 110. For example, the ends 190 may be cut and then ground to a desired size. A suitable grinding process may cause the sharp wires of the cloth layers 110 to "mushroom" or deform so as to lead to a larger size at the ends 190 and thereby reduce the gaps between the wires. Other methods to reduce the porosity at the ends 190 also may be employed. For example, a filler material may be injected between the wires by capillary action and brazed. Further, the ends 190 may be impregnated with a high temperature sealant and then sintered. As above, the sealants may include commercially available high temperature ceramic-metallic putties, and high temperature adhesives. Various types of welding techniques also may be used. Such methods in certain cases may provide better end gap leakage prevention through the bottom cloth layer 130 than the addition of a mechanical seal. Porosity reduction may extend to a depth of one of two cloth layer thicknesses from the ends of the seal. Higher depths may not be required and may reduce the compliance of the cloth layer significantly.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A cloth seal for insertion within two slots of adjacent turbine components, comprising:
    a plurality of cloth layers;
    a shim positioned between the plurality of cloth layers;
    first and second sides extending along a length of the cloth seal, each configured to be positioned within a respective one of the two slots of the adjacent turbine components;
    first and second side flanges, each of said side flanges extending along a respective one of the first and second sides; and
    an end seal positioned at an end of the plurality of cloth layers, extending substantially along a width of the cloth seal, and configured to span a gap between the adjacent turbine components and to block a leakage flow path through at least one of the plurality of cloth layers.

2. The cloth seal of claim 1, wherein the plurality of cloth layers comprises an upper cloth layer and a lower cloth layer and wherein the end seal blocks the leakage flow path through the lower cloth layer.

3. The cloth seal of claim 1, further comprising a plurality of end seals.

4. The cloth seal of claim 3, wherein at least one of the plurality of end seals is different from at least one other of the plurality of end seals.

5. The cloth seal of claim 1, wherein the end seal comprises an end flange seal.

6. The cloth seal of claim 5, wherein the end flange seal extends from the shim.

7. The cloth seal of claim 5, wherein the end flange seal extends into an end gap.

8. The cloth seal of claim 5, wherein the end flange seal comprises a substantially curved shape.

9. The cloth seal of claim 5, wherein the end flange seal comprises a substantially flat shape.

10. The cloth seal of claim 5, further comprising a plurality of shims and wherein each of the plurality of shims comprises the end flange seal thereon.

11. The cloth seal of claim 10, wherein the plurality of shims comprises a first shim with an upwardly bend end seal flange and a second shim with a downwardly bend end seal flange.

12. The cloth seal of claim 1, wherein the end seal comprises an end shim seal.

13. The cloth seal of claim 1, wherein the end seal comprises a clip seal.

14. The cloth seal of claim 1, wherein the end seal comprises a substantially compliant seal.

15. The cloth seal of claim 14, wherein the substantially compliant seal comprises a C-seal.

16. The cloth seal of claim 1, wherein the end seal comprises a high temperature sealant applied to at least one of the plurality of cloth layers.

17. A cloth seal for insertion within two slots of adjacent turbine components, comprising:
    a plurality of cloth layers;
    a shim positioned between the plurality of cloth layers;
    first and second sides extending along a length of the cloth seal, each configured to be positioned within a respective one of the two slots of the adjacent turbine components;
    first and second side sealing means, each of said side sealing means extending along a respective one of the first and second sides; and
    end sealing means positioned at an end of the plurality of cloth layers, extending substantially along a width of the cloth seal, and configured to span a gap between the adjacent turbine components and to block a leakage flow path through at least one of the plurality of cloth layers.

18. The cloth seal of claim 17, wherein the plurality of cloth layers comprises an upper cloth layer and a lower cloth layer and wherein the end sealing means block the leakage flow path through the lower cloth layer.

19. The cloth seal of claim 17, further comprising a plurality of end sealing means.

20. A cloth seal for insertion within two slots of adjacent turbine components, comprising:
- an upper cloth layer;
- a lower cloth layer;
- a shim positioned between the upper cloth layer and the lower cloth layer;
- first and second sides extending along a length of the cloth seal, each configured to be positioned within a respective one of the two slots of the adjacent turbine components;
- first and second side flange seals, each of said side flange seals extending along a respective one of the first and second sides; and
- one or more end flange seals positioned at an end of the upper cloth layer and the lower cloth layer, extending substantially along a width of the cloth seal, and configured to span a gap between the adjacent turbine components and to block a leakage flow path therethrough.

* * * * *